United States Patent [19]
George

[11] Patent Number: 5,822,546
[45] Date of Patent: Oct. 13, 1998

[54] HAND HELD DOCKING STATION WITH DEPLOYABLE LIGHT SOURCE, RECHARGEABLE BATTERY PACK AND RECESSED GRIP, FOR CONNECTING TO A PALM TOP COMPUTER

[76] Inventor: Stanley W. George, 3159 Inclinado, San Clemente, Calif. 92673

[21] Appl. No.: 613,060

[22] Filed: Mar. 8, 1996

[51] Int. Cl.⁶ .................................................. G06F 13/00
[52] U.S. Cl. .......................................... 395/281; 364/706
[58] Field of Search .................................... 361/683–687, 361/724; 364/706; 395/281

[56] References Cited

U.S. PATENT DOCUMENTS

| | | | |
|---|---|---|---|
| 4,837,590 | 6/1989 | Sprague | 346/145 |
| 5,091,873 | 2/1992 | Araki | 364/708.1 |
| 5,410,141 | 4/1995 | Koenck et al. | 235/472 |
| 5,477,239 | 12/1995 | Busch et al. | 345/102 |
| 5,497,464 | 3/1996 | Yeh | 395/281 |
| 5,528,758 | 6/1996 | Yeh | 395/281 |
| 5,555,491 | 9/1996 | Tao | 361/686 |
| 5,571,859 | 11/1996 | Yeh | 395/281 |

Primary Examiner—Lance Leonard Barry, Esq.
Attorney, Agent, or Firm—Christie, Parker & Hale, LLP

[57] ABSTRACT

A hand-holdable docking station is adapted for mechanical and electrical connection with a palmtop computer. The docking station comprises a housing and means for securely affixing a palmtop computer to the housing. A deployable light source is housed/stored in a receptacle provided in the housing. The light source is deployable to a position such that the illumination footprint illuminates the screen of an attached palmtop computer but does not obscure viewing of the screen. The docking station includes a rechargeable battery pack for providing power to the deployable light source and the attached palmtop computer. Grasping means are included for ergonomic positioning of a human hand to allow substantially fatigue free handling of the docking station and for positioning a grasping hand such that the hand does not obscure viewing of the attached palmtop computer screen. The docking station also includes an electronic function board further including a facsimile/modem, a microprocessor and memory, and a pager connected to the microprocessor for receiving alpha/numeric page signals in excess of 55 characters per alpha page session.

14 Claims, 5 Drawing Sheets

HAND HELD DOCKING STATION WITH DEPLOYABLE LIGHT SOURCE, RECHARGEABLE BATTERY PACK AND RECESSED GRIP, FOR CONNECTING TO A PALM TOP COMPUTER

FIELD OF THE INVENTION

The present invention relates to a portable, battery-operated docking station for a hand-held computer, such as a palmtop computer or a personal digital assistant, and in particular, to a docking station which functions as a power pack and provides expanded communications functions.

DESCRIPTION OF THE RELATED ART

Small, hand-held, battery-operated personal computers have become well known in a variety of applications, particularly in the area of palmtop-type computers also commonly termed "personal digital assistants".

One example of such a personal digital assistant (PDA), is the popular NEWTON PDA, models 100, 110, and 120, manufactured by Apple Computer, Inc. of Santa Clara, Calif. (referred to herein as the NEWTON). Briefly, the NEWTON PDA is a hand-held, battery-operated electronic device which is capable of being programmed to receive input data, by means of contacting the screen with an electronic pointer or stylus, i.e. PEN based. The screen of the NEWTON PDA is contact sensitive, such that the stylus may be used to create drawings on the screen, enter handwritten notes, or the like, all of which may be stored in the PDA memory for eventual recall. Further, application software may be executed by the PDA, by entering commands, or invoking application sub-functions, through contacting the PDA screen by the stylus or pen, in designated locations defined by the application.

As with other personal digital assistants, application programs are loaded into the NEWTON by means of a PCMCIA compatible application/memory card, into which the application instruction steps have been coded. Changing an application, is, thus, as simple as removing one PCMCIA card and replacing it with another.

Notwithstanding the flexibility and ease of use of a personal digital assistant, such as the NEWTON, there are several problems associated with such devices that have a significant impact on both their efficiency of use and on the types of applications that may be usefully employed therewith.

First, with regard to their efficiency of use, personal digital assistants such as the NEWTON derive their power from four AA or AAA dry-cell batteries contained in a battery compartment housed within the unit. The power available from batteries of this type is only sufficient to allow operation the apparatus for a continuous use period of less than about two hours. The exhausted batteries must then be removed and replaced with new ones. Given the present cost of AA or AAA dry-cell batteries, this results in an approximate cost-to-operate of about $1.00 per hour.

Furthermore, in order to conserve the limited amount of power available, the screen in palmtop computers is typically a passive liquid-crystal-display (LCD) type with no provisions for internal lighting. Consequently, it is impossible to practicably use such a personal digital assistant in a dark or semi-dark environment.

Second, with regard to the types of applications usable on such an apparatus, personal digital assistants, such as the NEWTON, have no provision for electronic circuitry which supports a communications capability with the exception of a PCMCIA based function card. However, this will not allow the simultaneous use of an additional PCMCIA card which hosts an applications program. For example, personal digital assistants are not adapted to communicate with a modem while hosting another application, and are thus incapable of sending or receiving facsimile transmissions thereof, unless connected to communicate with a full-function lap-top or desk-top computer system. This limitation thus defeats the palmtop utility of the personal digital assistant. Indeed, the relatively small size of a palmtop computer (approximately 8"×4"×¾") limits the amount of circuitry that may be accommodated within the apparatus to substantially the batteries, the screen and its associated electronic display circuitry, and the input/output circuitry associated with the stylus.

There is an additional problem attendant with the size and shape of a palmtop computer. This problem is an ergonometric one, in that it is difficult and tiring to grasp and hold a palmtop computer for extended periods of time. To be effectively grasped, a palmtop computer is held in the palm of the hand with the thumb and fingers open so as to grip the sides of the device in a vice-like fashion. The apparatus cannot be conveniently gripped along its side, because its screen typically extends to the outside edge of the apparatus, and grasping the device along its edge, or side, would occlude a substantial portion of the screen. In addition, the device is not easily adaptable to be placed on a flat surface such as a desk or a table in a manner such that the screen is inclined for easy visibility.

Accordingly, it would be advantageous to combine a palmtop computer, or personal digital assistant, with a docking station that would overcome the above-mentioned deficiencies. Such a docking station would be ergonometrically designed to be easily grasped by the human hand, regardless of its size, as well as adaptable to be placed on a flat surface in an orientation such that the screen is easily viewed by a person in the seated position. Such a docking station would further include an internal power pack, adapted to provide power to a palmtop computer, or personal digital assistant, and such power pack would be able to allow the apparatus to operate in continuous use for a period in excess of three hours. The power pack should provide sufficient electrical power to operate a deployable light source, for illuminating the otherwise dark screen of the personal digital assistant, as well as provide sufficient power to operate various electronic circuitry, including a modem, or fax/modem, or other communications apparatus, provided within the docking station housing.

SUMMARY OF THE INVENTION

The present invention provides the desired features in a hand-holdable docking station adapted for mechanical and electrical connection with a palmtop computer. The docking station is constructed to include a housing having a top, bottom, two sides and a front and back face for enclosing and defining an interior volume. A palmtop computer, or personal digital assistant is securely affixed to the docking station.

In one particular embodiment, the docking station is dimensioned to attach directly to the cover housing of an a NEWTON Model 110 or 120 personal digital assistant. The invention includes a deployable light source, housed/stored in a receptacle, provided in the housing, when the light source is in an undeployed position. When deployed, the light source is positioned such that the illumination footprint illuminates the screen of the attached palmtop computer. In particular, the light source is positioned to illuminate only the computer screen, but is disposed so as not to obscure any portion of the screen.

The invention includes a rechargeable battery pack disposed within the housing for providing power to the deployable light source and the attached palmtop computer. Electrical communication is established between the docking station and the attached computer by coupling means suitably comprises a power cable and an 8-pin serial communication cable.

In one aspect of the invention, at least one gripping surface is formed in the back face of the housing which includes a recess in the back face of the housing into which the fingers of a human hand may be inserted. The recess is spaced-away from the sides of the housing a sufficient distance to form a griping surface having the shape of a cupped human hand when viewed in cross-section. The at least one gripping surface provides an ergonomic means of handling the docking station such that a grasping hand will not obscure any portion of the computer screen.

In a further aspect of the invention, a function board is provided within the housing, the function board including electronic communication circuitry operatively responsive to signals communicated between the docking station and an attached palmtop computer over the 8-pin serial communication cable. Signals are communicated between the function board and attached computer by RS-232 communication protocols. An RJ-11 phone jack, in electrical communication with the function board, is provided on the top of the housing.

In yet another aspect of the invention, the function board includes a facsimile/modem circuit, a microprocessor, a memory coupled to the microprocessor, and pager subsystem circuitry connected to the microprocessor for receiving alpha/numeric page signals. The pager circuitry includes means for signalling the microprocessor that a page is incoming, the microprocessor receiving the page signals from the pager circuitry and storing the page signals in the memory such that alpha/numeric pages in excess of 55 characters are received by the pager subsystem circuitry during a single alpha page session. Means are also provided for alerting a user that a page has been received.

BRIEF DESCRIPTION OF THE DRAWINGS

These features, aspects and advantages of the present invention, as well as other features, aspects and advantages of the invention, will be more fully understood when considered with respect to the following detailed description, appended claims, and accompanying drawings, wherein:

DETAILED DESCRIPTION OF THE PREFERRED EMBODIMENT(S)

Figure 1:
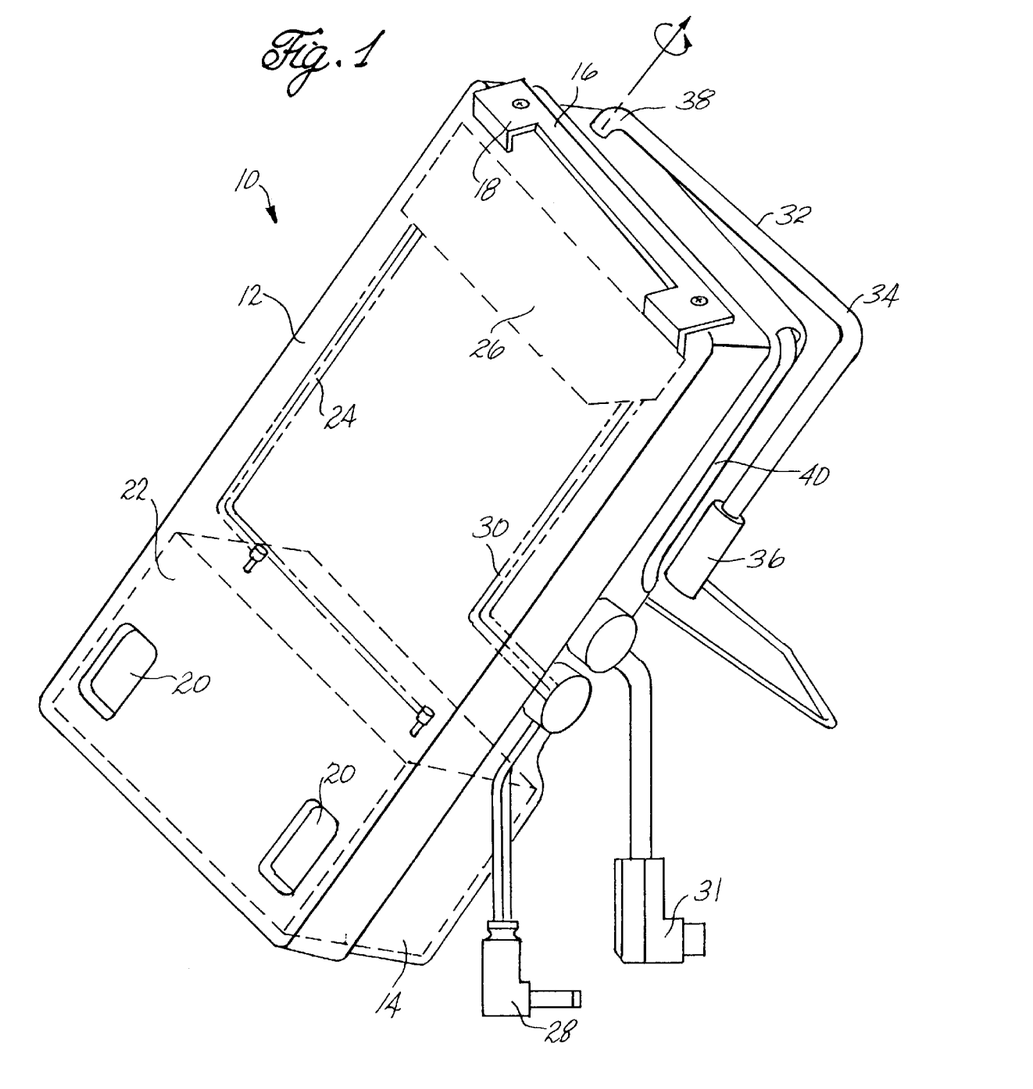
FIG. 1 is a perspective, front-side view of a palmtop computer docking station in accordance with the invention.

Referring to FIG. 1, there is depicted a perspective, front-side view of a palmtop computer-type docking station, indicated generally at 10, in accordance with the invention. The docking station 10 has a generally rectangular shape, and is of a size to receive a palmtop computer of, for example, a NEWTON type on its face, in mating engagement. In the embodiment depicted in FIG. 1, the dimensions of the docking station 10 are such that its rectangular footprint substantially matches the rectangular footprint of, for example, a NEWTON-type palmtop computer, and are preferably 8¼" long x4¼" wide x2¾" deep.

Docking station 10 is constructed of a molded plastic material, such as ABS (butadyene styrene) and comprises a cover, or front portion 12 and a base, or back portion 14 which are mated together to form a housing. Mating the cover, or front portion 12 to the base portion 14 may be accomplished by a variety of well known connection methods. For example, the cover, or front portion may be molded slightly oversized, such that the base portion 14 may fit therein so that locking tabs provided on the inside of the periphery of the cover molding 12 may snap into matching recesses on the base portion 14. Alternatively, the cover and base portions may be connected together by use of hinges, screws, or the like.

With reference to FIG. 1, the major surface of the docking station 10, depicted therein, is the cover of the docking station, with all of the other indicia of direction, such as top, bottom, right-hand side, and left-hand side, following therefrom.

Mating the docking station 10 with a palmtop-type computer is effectuated by an attachment clip 16 comprising a spring loaded rigid bar, affixed to the top surface of the docking station 10 by, for example, screws. As is shown in FIG. 1, the attachment clip 16 includes two folded over tabs 18 the ends of which are biased against the front surface of the docking station. When a NEWTON palmtop-type computer is attached to the docking station 10, an attachment lip (typically provided on such a computer) is inserted under the tabs 18, which, in turn, apply a spring tension to the computer's attachment lip thereby securing the computer to the docking station. The other end of the palmtop computer is secured to the docking station by pressing a pair of rubberized feet, provided as a stand on most palmtop-type computers, into mating receptacles 20 provided on the front face of the docking station 10 for such purpose.

In an alternative embodiment of the invention, particularly when the invention is to be connected for use with a NEWTON Model 110 or 120 palmtop computer, the base portion 14 of the docking station 10 is directly attached to the back of the palmtop computer. The cover 12 of the docking station 10 is removed, as is the back cover of the NEWTON 110 or 120. The remaining portions of each apparatus are mated together; namely, the front of the NEWTON, including the screen and electronic circuitry, and the base 14 of the invention, also including the electronic and functional elements to be described below. To accommodate direct attachment, the snap-fit recesses on the base 14 are positioned to mate with corresponding snap-fit tabs provided on the cover portion of a Model 110 or 120 NEWTON. Thus, the invention provides for an efficient structural and functional enhancement, when directly attached to an appropriate model palmtop computer.

In order to functionally enhance the capabilities of an attached palmtop computer, the docking station 10 further comprises an internal battery pack 22 which is enclosed in the bottom portion of the housing. As will be described in greater detail below, the battery pack 22 provides power for a deployable light source and various internal circuitry that are provided in the various embodiments, as well as provides power for extended use of an attached palmtop-type personal computer. The battery pack 22 is preferably a rechargeable, sealed lead-acid battery that provides six volts of power, rated at 1.2 amp hour. It has been found that batteries having these characteristics are able to provide continuous power for both a light source and a NEWTON-type palmtop computer for up to five hours of continuous use, and up to three hours of continuous use if additional functional circuitry is included. Examples of such batteries that meet the specifications, are the PowerSonic, Part. No. PS612, the Panasonic, LCR6V1.3P, and the like.

A wiring harness 24 (shown in phantom in FIG. 1), is connected between the battery pack 22 and a charger/power distribution printed circuit board 26, disposed in the interior of the docking station housing. The charger/power distribution printed circuit board 26 is, in turn, connected to a power jack 28 by an internal power cable 30. The power jack 28 is a standard two-conductor power pin and is provided to fit into a mating power receptacle in a NEWTON, in order to provide power thereto.

Power from the battery pack 22 is also provided to a deployable light source or light wand 32, connected to the top of the docking station 10, and which comprises a rotatable U-shaped support arm 34 terminating, at the distal end thereof, in a light fixture housing 36.

The proximal end 38 of the light wand 32 is bent over into an L-shape, the short leg of which is, in turn, inserted into a bushed receptacle, provided in the top surface of the docking station 10 for receiving the light wand 32 in a friction fit. The proximal end 38 of the light wand 32 thus, defines a rotatably movable shaft, around the axis of which the light wand is free to rotate.

When in its undeployed, or secured position, the proximal end of the light wand 32, carrying the housing 36, rests within an elongated cavity 40, molded into the housing. The cavity 40 is an elongated, concave indentation having a length and depth sufficient to receive the distal end of the light wand and the light housing securely therein. Because the docking station is contemplated for use in a variety of environments, it is desirable that the light wand 32 be able to be secured away in a recess, or receptacle, so that it will not protrude when not in use. The receptacle 40 provides a convenient indentation in which to store the light wand 32, during, for example, daytime use of the docking station, thus preventing the light wand 32 from hooking onto or otherwise interfering with other objects.

During use, the light wand 32 is swung, or swiveled on the proximal end axis, through an arc until the light housing 36 is suspended over the surface of an attached palmtop-type computer. As will be described in greater detail below, the light housing 36 is not placed directly over the center of the computer screen. An unobstructed view of the computer screen is obtained by suspending the light housing 36 to one side of the screen, and adapting the light source to provide an appropriately angled light footprint. Thus, even when deployed, the light wand 32 is designed to function unobtrusively.

Figure 2:
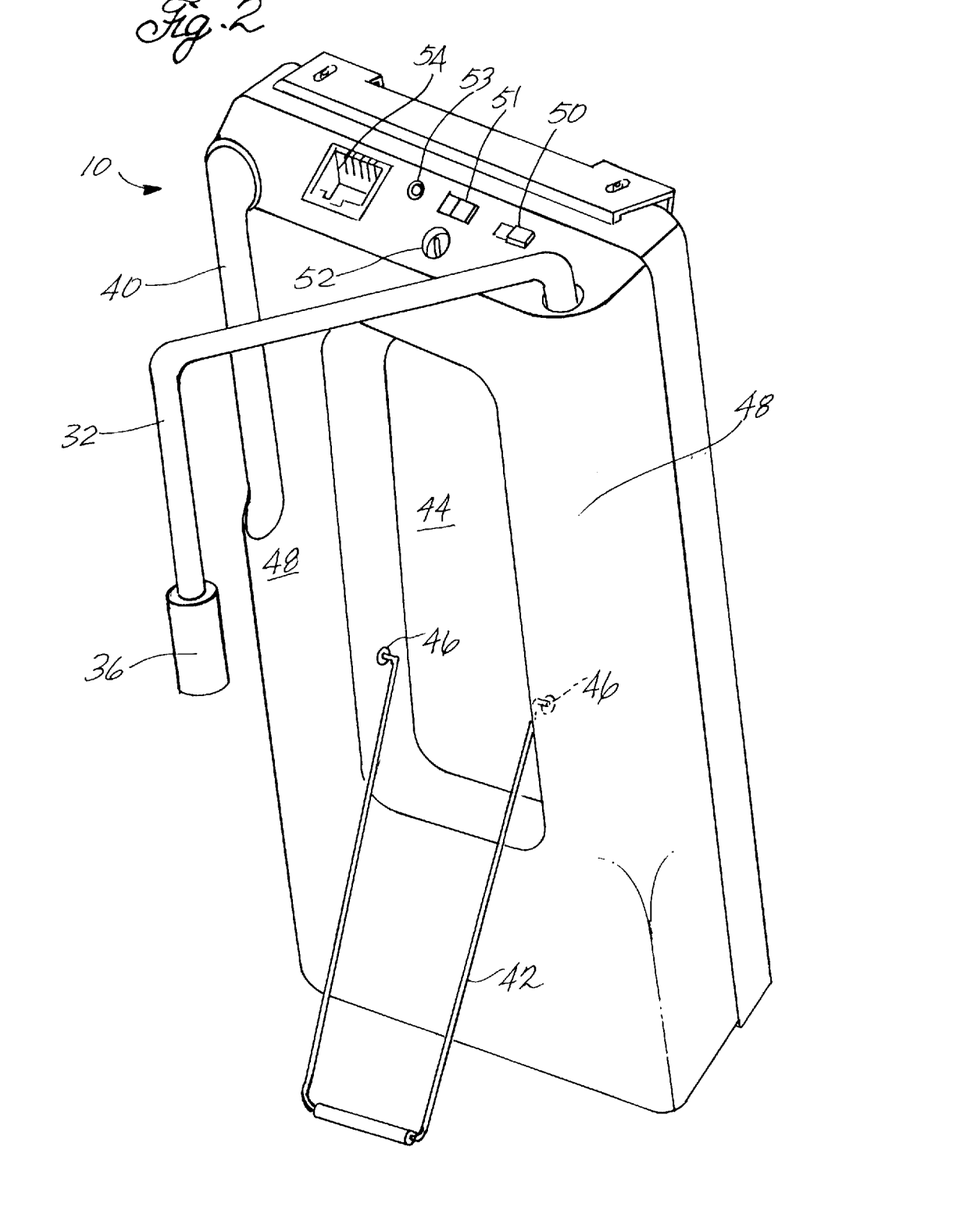
FIG. 2 is a perspective, back-side view of the palmtop computer docking station of FIG. 1.

Turning now to FIG. 2, there is depicted a perspective, back-side view of the docking station 10. A wire stand 42 is provided to support the docking station 10 in an elevated position when hands-off operation is desired. When not in use, the stand 42 is folded into a cavity 44, molded in the back of the docking station housing. Two interference buttons 46 are provided in the sides of the cavity 44 and function as stops against which the wire stand 42 rests when the stand is folded out for use. The buttons 46 limit the rotational travel of the stand 42 and, thus, prevent the bottom of the stand from sliding away from the docking station 10 and, thereby, prevent the docking station from falling over. The location of the buttons 46 further set the angle to which the stand 42 may be deployed and, therefore, the angle at which the docking station is supported by the stand. There are various angles at which the docking station may be supported, but preferably the buttons are located such that the stand supports the docking station at an efficient angle for viewing when the station is placed on a desk top, and the viewer is in the seated position.

In addition to providing a storage receptacle for the stand 42, the cavity 44 also functions to define two hand holds, or griping surfaces 48, molded in the back portion of the device housing, and disposed to either side of the central cavity 44. As can be seen in FIG. 2, the housing, in the region of griping surfaces 48, is molded in a curved shape, to provide a surface contour having the look and feel of a pontoon, or grip. The radius of curvature of the griping surfaces 48 is on the order of about ½" to about 1", preferably between about 0.6 to 0.7", and is adapted to be easily grasped by a wide range of human hand sizes. The hand wraps around the griping surface 48 and the fingers are inserted into the central cavity 44. The docking station 10, with an accompanying palmtop-type computer is, thus, able to be easily manipulated, and held for extended periods of time with very little hand fatigue.

An additional advantage of the gripping surfaces 48 is that the hand is cupped, in a natural position, when grasping the apparatus. The thumb rests in a neutral position along the side of the apparatus such that neither the thumb, nor the heel of the hand folds over the front surface of the apparatus (or an attached computer). This feature prevents the screen of an attached computer from being obscured by any part of the hand, thereby allowing full visibility of the entire surface of the computer.

As will be apparent from FIG. 2, the docking station griping surfaces 48 are adapted for use by either right-handed or left-handed persons. Securing the light wand 32 in its storage recess 40, has the further advantage of promoting a generally unobstructed grasping surface when the docking station is grasped with the right hand. Were the light wand not recessed away, during periods of non-use, it would interfere with the smooth, tactile interaction between the grasping surface 48 and the hand. In addition, hand pressure might well squash the light housing 36 against the hard plastic of the docking station housing, thus damaging the light housing.

A single-pole, single-throw switch 50 is provided on the top of the docking station 10 which controls the operation of the light source provided in light housing 36. The switch 50 is connected between the light housing 36 and the power distribution circuit board 26 (FIG. 1). A recharging receptacle 52 is also provided on the top surface of the housing and comprises a standard coax, male, power pin. The recharging receptacle 52 is connected to the battery pack 22 (of FIG. 1) through the charger/power distribution circuit board 26. Typically, the PS-612 battery is rechargeable from exhaustion to full power in about 14 hours.

An RJ-11, female, 5-wire communication receptacle 54, is also provided on the top surface of the docking station 10.

The communication receptacle 54 provides for connection between the docking station 10 and a common carrier telephone line in order to effectuate modem, or facsimile transmission of information to and/or from the palmtop computer attached to the docking station. As will be described in greater detail below, the communication receptacle 54 is connected to communication circuitry disposed within the housing of the docking station, which is, in turn, coupled to the palmtop computer by the standard data cable 31 (FIG. 1) which connects to the computer's serial port.

In the event such communications circuitry is provided, for example a modem, a second, on-off switch 51 also provided on the top of the docking station. On-off switch is connected between the power distribution circuit board 26 and the power leads of any additional circuitry provided interior to the docking station 10. An indicator LED 53 is also provided on the top of the docking station 10, and allows easy visual confirmation of whether the switch 51 is in the on or off position.

Figure 3:
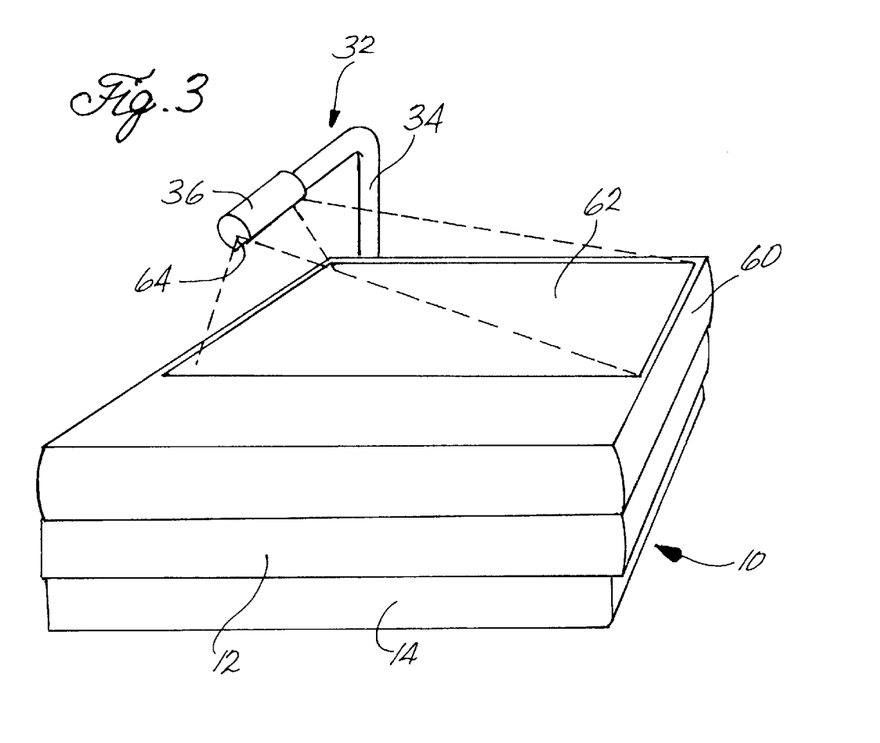
FIG. 3 is a perspective, front-side view of the palmtop computer docking station of FIG. 1, with a palmtop computer affixed thereto.

Turning now to FIG. 3, there is depicted a perspective front-side and end view of the docking station 10, in which a NEWTON-type palmtop computer 60 is attached to the front 12 of the docking station. The light wand 32 has been deployed from its housing recess (40 of FIG. 2), and swiveled such that the support arm 34 is vertical, thus suspending the light housing 36 above the left-hand edge of the palmtop computer 60. When the light wand 32 is activated, a beam of light is directed on to the screen area 62 of the palmtop computer 60. The light beam is directed through a cut-out, or slit 64, such that the light foot print covers substantially the entire surface area of the screen 62, but not beyond.

Figure 4:
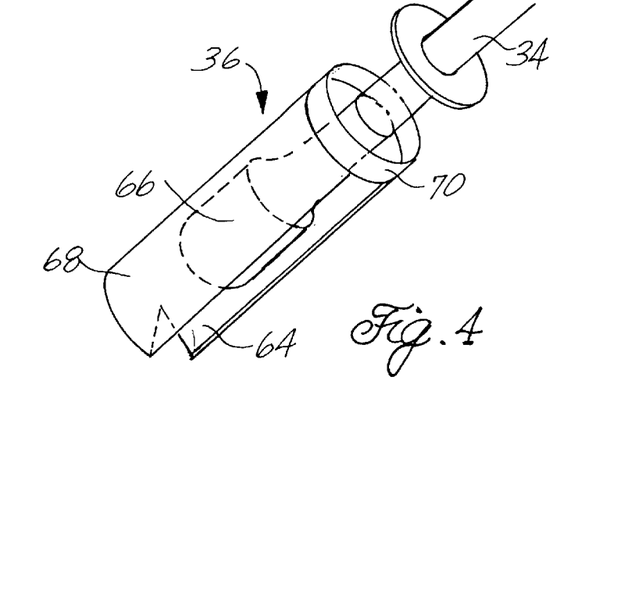
FIG. 4 is a partial, cross-sectional, end view of the invention of FIG. 3, illustrating the light footprint of the deployable source.

FIG. 4 depicts a perspective view of an embodiment of the light housing 36 in accordance with the practice of principles of the invention. A light source 66 in the form of an incandescent, or halogen, light bulb is connected to the distal end of the support arm 34. Light bulb 66 is surrounded by a cylindrical hood 68, having a cut-out, or slit 64, formed along its major surface. The sides of the slit constrain the foot print of a resulting light beam provided by the light source 66, and focused the beam into a generally wedged shape. The plane area illuminated by such a wedge shaped light beam depends solely on the distance of light source from the area to be illuminated. Thus, if the area of the screen 62 (of FIG. 3) is known, the light housing 36 need only be suspended an appropriate, and easily calculated, distance above the surface of such screen in order to illuminate the screen and nothing else.

As is further depicted in FIG. 4, a bearing surface 70 is also provided on the distal end of the support arm 34. The cylindrical illumination hood 68 is slid over the bearing surface 70, thus, contacting the bearing surface in friction fit fashion, so as to be rotatably attached thereto. Thus, minor adjustments may be made in the angle of the light beam that issues through slit 64, by rotating the hood 68 around the bearing surface 70 of the support arm 34. It will be appreciated by one skilled in the art, that the cylindrical hood 68 is removable from the support arm 34, thus providing easy access to and replacement of the light source 66. From the foregoing, it is evident that the rotatable support arm 34 and independently rotatable light housing 36, in combination, provides means for positioning the light wand 32 anywhere along a circular arc, disposed over the surface of a palmtop computer screen, and further provides means for defining a light beam foot print that illuminates substantially only the computer screen, regardless of the arcuate position of the light wand.

Figure 5:
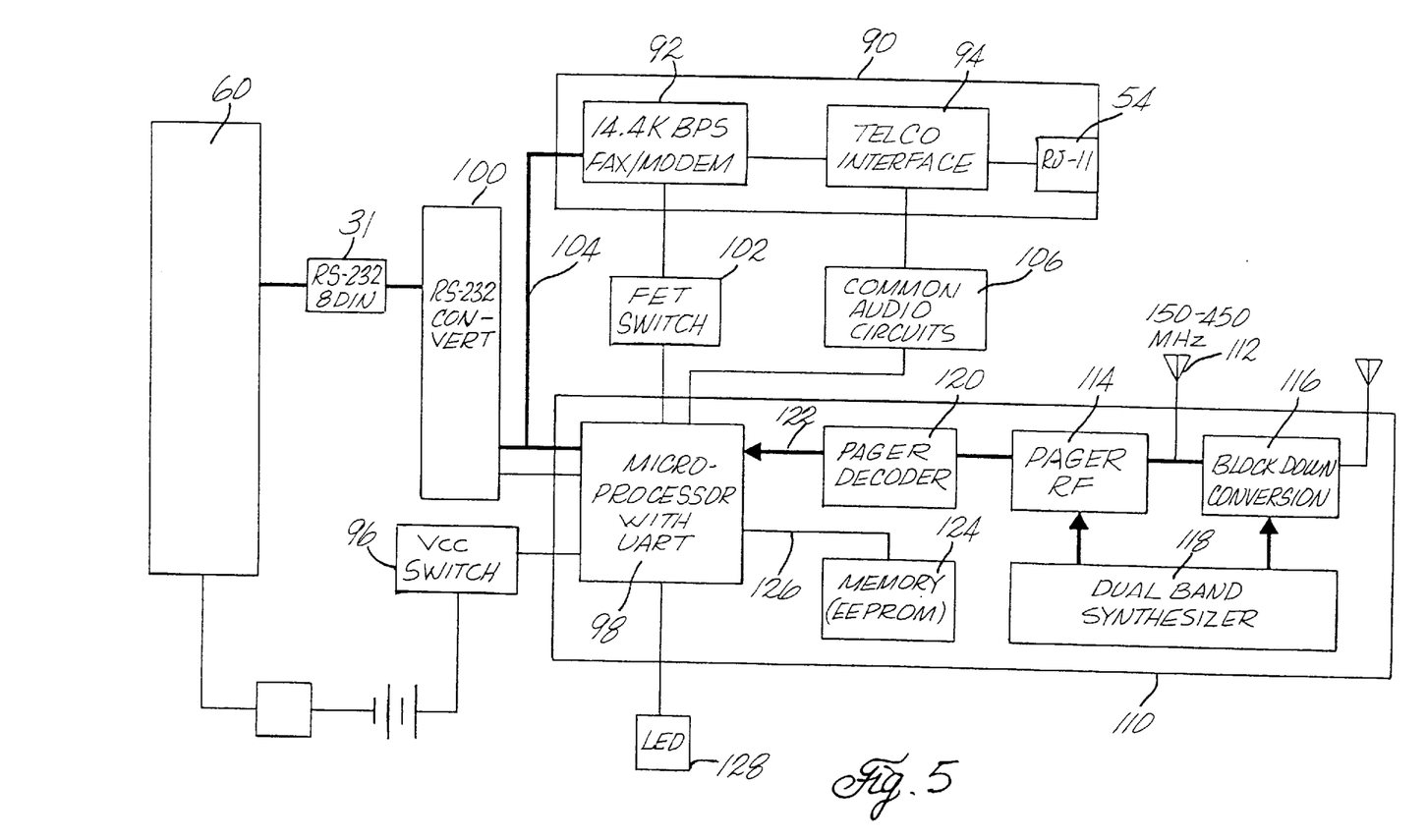
FIG. 5 is a schematic illustration of the invention of FIG. 1 electrically connected to a palmtop computer to provide electrical power and communication capability thereto.

Turning now to FIG. 5, communication capability is provided by the docking station 10 to an attached NEWTON-type palmtop computer by means of electronic circuitry disposed on a function board 80 mounted inside the housing of the docking station 10. Function board 80 is a printed circuit board for carrying electronic circuitry and other electronic components. The function board 80 is depicted, in FIG. 5, as folded away from the base 14 of the docking station 10. In practice, the function board is folded over, and disposed within the docking station space 14 in the space between the power pack 22 and charger/power distribution circuit board 26. The function board 80 is connected to the base 14 by any of a variety of connection methods well known to those skilled in the art, such as push-pins, clips, screws, or the like. Electrical connection is made to the function board 80 by a power cable 84 connected between the function board and the charger/power distribution circuit board 26. Electrical power is provided to the various functional portions of the function board 80 over power cable 84 by power distribution circuitry on the power distribution circuit board 26. For example, power is provided to an exemplary modem when the modem on-off switch 51 is placed in the "on" position. Alternatively, power may be continuously provided over the power cable 84 by directly connecting the power cable to the wiring harness 24 that makes electrical connection with the power pack 22.

Data communication, on and off the function board 80 is provided by a data cable 82 connected between the function board and the data plug 31. Data plug 31 is preferably a serial-type plug, adaptable to be coupled to the serial (or APPLETALK) port of a palmtop computer such as a NEWTON. Internal circuitry in the NEWTON accesses the serial port, thereby communicating with electronic circuitry on the function board 80 via the data cable 82. It will be recognized by one skilled in the art that the function board 80 is an optional component, and need not be provided in all models of the docking station 10.

Figure 6:
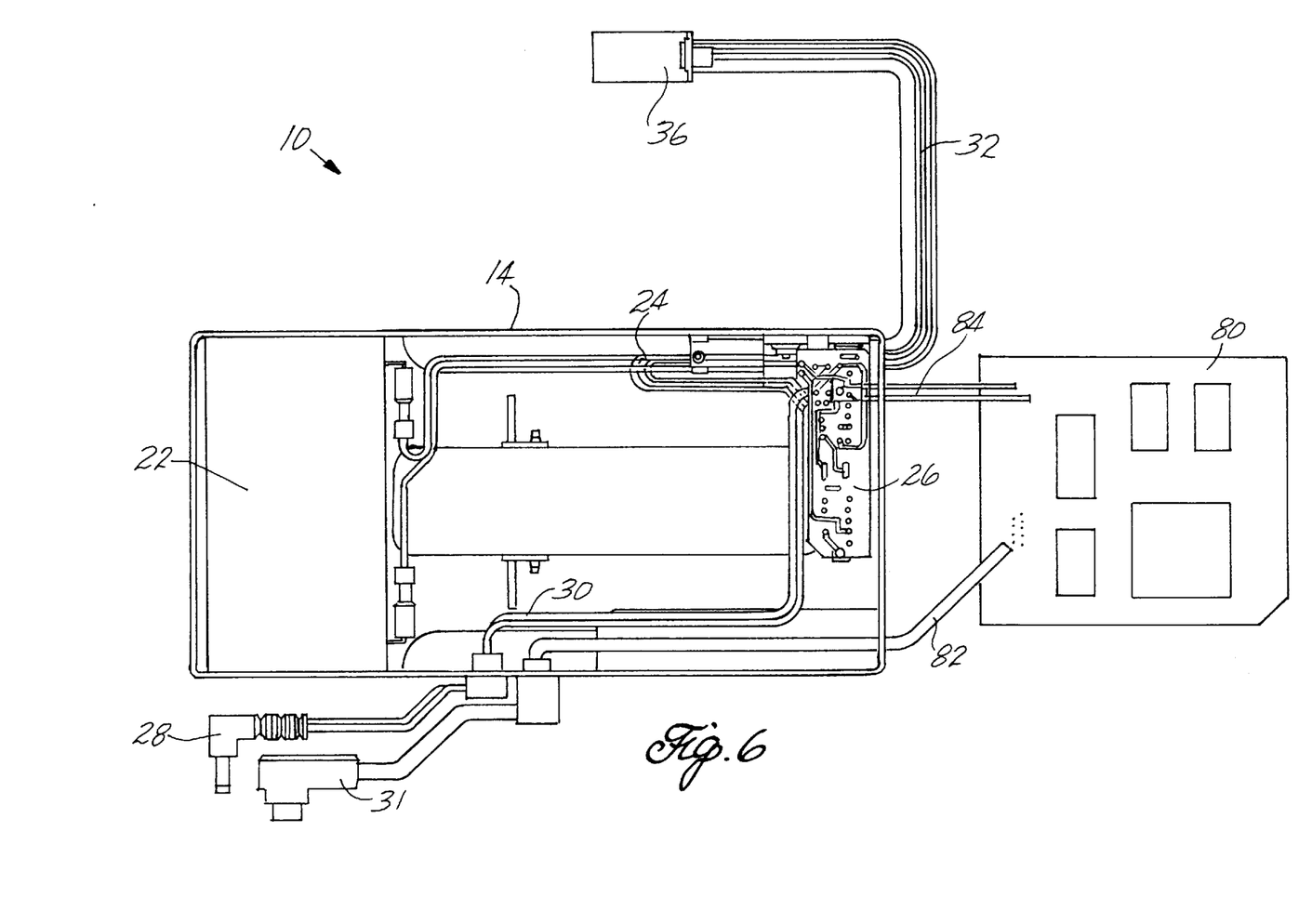
FIG. 6 is a top-level, functional block diagram of electronic circuitry disposed on a printed circuit board in accordance with the invention.

FIG. 6 depicts a top-level, functional block diagram of electronic circuitry disposed on the function board 80 for providing communication functions to a NEWTON-type palmtop computer attached to the docking station of the present invention.

In accordance with practice of principles of the invention, the function board 80 includes facsimile and modem transmission circuitry 90 connected to an RJ-11-type five-lead standard telephone line receptacle, which is in turn connected to a standard telephone line. The facsimile and modem circuitry 90 comprises a 14.4 K-baud (or kilo-bits per second, KBS) fax/modem chip, of the type commercially manufactured by Rockwell International Corporation. Although the exemplary embodiment of FIG. 6 is described as employing a 14.4 K-baud modem, it will be recognized by those skilled in the art that modems operating at various other baud rates may be substituted without violating the spirit of the invention. Thus, the facsimile and modem circuitry 90 may equally comprise modems having 2400, 4800, 9600, 14,400, and 18,800 baud rates. Circuitry 90 further comprises a TELCO interface chip 94, connected between the fax/modem chip 92 and the RJ-11 telephone line receptacle 54. The TELCO interface chip 94 provides for signal level adjustment and line interfacing between a standard 5-wire telephone line and the 14.4 K baud fax/modem chip 92.

When a palmtop computer user desires to access the communication capabilities of the docking station 10, the palmtop computer is first attached to the docking station. Cabling between the palmtop computer and the docking station provides 6 volt DC power from the rechargeable battery (22 of FIG. 1) via the connected power jack (28 of FIG. 1), and RS-232 signal communication by means of a dual in-line (DIN) 8-pin serial connector 31. Electrical power is provided to the function board 80 by the power pack 22 through the VCC switch, which thus allows the user control over power to the communication functions. When the VCC switch 96 is in the "on" position, a software program controlled microprocessor is activated thereby. The microprocessor 98 includes universal asynchronous receiver transmitter (UART) port that is connected to an RS-232 conversion circuit 100, in turn, connected to the RS-232 serial port 31. Signals received from the palmtop computer 60 are converted from EIA-STD-RS 232 level signals to TTL signals by the RS-232 conversion circuit 100. Signals received from the palmtop computer 60 by the RS-232 conversion circuit 100 are monitored by the UART port of the microprocessor 98. The RS-232 conversion circuit 100 indicates to the microprocessor 98 that valid RS-232 signals are available.

Once valid RS-232 signals are detected, the microprocessor 98 enables a FET switch 102 which, in turn, enables electrical power to the facsimile and modem communication circuitry 90. Standard AT protocol modem command signals are directed by the palmtop computer 60 to the 14.4 K baud fax/modem chip 92 over a communication bus 104 connected between the fax/modem chip 92 and the RS-232 conversion circuit 100. The fax/modem chip 92 processes the AT modem commands, in a conventional manner, to perform its function of telecommunication signaling. These telecommunication signals are provided to the RJ-11 phone jack, through the TELCO interface chip 94 in conventional fashion. In the same manner, an operator, by providing appropriate input to the palmtop computer 60, places the facsimile and modem communication circuitry 90 on the function board 80 in condition to receive a facsimile or modem transmission by providing the appropriate RS-232 signal, through the RS-232 conversion circuit 100 to the microprocessor 98. The microprocessor 98 activates the FET switch 102 which provides power to the communication circuitry 90, and standard AT protocol modem commands are provided over the signal bus 104 to place the fax/modem chip 92 into a communications/receive mode. Communication information is received over the phone line through the R-11 phone jack 54, interfaced to the fax/modem chip 92 by the TELCO interface chip 94. The communications information is then directed over signal bus 104 to the RS-232 conversion circuit 102 once it is converted from TTL levels to RS-232 level signals for receipt by the palmtop computer 60.

The signal bus 104 is also connected, in parallel fashion, to the internal data and command bus of the microprocessor 98. This allows the microprocessor 98 to monitor the signals on signal bus 104 and determine the end, as well as the beginning, of a communication session. At the end of a communication session, the microprocessor 98 detects the absence of valid signals on the signal bus 104, and automatically depowers the communications circuitry 90, by removing power from the FET switch 102 under software program control.

Common audio circuits 106 are connected between, and shared by, the TELCO interface chip 94 and microprocessor 98. The audio circuits 106 generally indicate the status of communication activities, and may include a loud speaker to enable an operator to determine if a communication connection has been properly made.

In an additional embodiment of the invention, paging subsystem circuitry 110 is also provided on the function board 80. Paging signals in the 150 (Mhz) and the 450 (Mhz) band are received over a 150–450 (Mhz) antenna 112 and directed to a pager RF circuit 114 for processing. Pager signals in the 900 (Mhz) band are received over a 450–950 Mhz antenna and frequency converted as a block of frequencies from about 100 to about 250 Mhz by a block down conversion circuit 116, from whence they are processed by the pager RF circuit 114. A dual band synthesizer 118 provides oscillation clock signals to both the block down conversion circuit 116 and the pager RF circuit 114. Pager signals processed by the pager RF circuit 114 are decoded by a pager decoder 120 which additionally signals the microprocessor 98 that a page is incoming. Under software program control, the microprocessor 98 receives the incoming page from the pager decoder circuit 120 over a data bus 122, and stores the page information in a memory 124. The memory 124 is preferably a 2K bit EEPROM provided external to the microprocessor 98 and connected thereto by a memory data bus 126. Alternatively, the memory 124 may be provided internal to the microprocessor 98 and may be constructed from any one of a variety of well-known memory technologies, such as, static RAM, dynamic RAM, or any other memory technology that is capable of having data read therefrom and written thereto.

After the microprocessor 98 receives an incoming page and stores the page information in the memory 124, the microprocessor issues a control signal which illuminates an LED 128, indicating to the user that a page has been received. The user may then execute an applications program on the palmtop computer 60 that accesses the memory 124 through the microprocessor 98, and reads the page information therefrom. The palmtop computer application program instructions include a serial control sequence, provided on the signal bus 104 through the RS-232 conversion circuit 100, that instructs the microprocessor 98 not to enable the FET switch 102 that provides power to communication circuitry 90. The pager information, stored in the memory 124, is accessed by the applications program and the page contents are displayed to the user on the palmtop computer screen. In addition, the page contents may be saved in computer memory provided internal to the palmtop computer 60.

It should be evident from the foregoing description, that the amount of information received by the paging subsystem 110 is limited only by the size of the pager subsystem's memory 124. Accordingly, it will be understood that the pager subsystem 110 is not bound by the 55 character per message limit of conventionally available alpha/numeric pagers. For example, an electronic messaging application such as MICROSOFT MAIL, manufactured by Microsoft, Inc. of Redmond, Wash., is capable of transmitting text information, via an alpha page, to an alpha pager. If, however, the text to be sent exceeds 55 characters, conventional alpha pagers require that multiple messages be sent. In contrast, the pager subsystem 110 of the present invention, is adaptable to receive several text pages of a MICROSOFT MAIL message during a single alpha page session.

The above description of preferred embodiments of the hand-held power pack and docking station, provided in accordance with the invention is for illustrative purposes. Because of variations, which will be apparent to those skilled in the art, the scope present invention is not limited to the embodiments described above. The scope of the invention is as set forth in the appended claims.

What is claimed is:

1. A hand-holdable docking station adapted for mechanical and electrical connection with a palmtop computer, the docking station comprising:

a housing having a top, a bottom, a left side, a right side, and front and back faces, the housing for enclosing and defining an interior volume;

means for securely affixing a palmtop computer to the docking station;

a deployable light source, housed/stored in a receptacle, provided in the housing, when the light source is in an undeployed position, the light source being deployable to a position such that the illumination footprint illuminates the screen of an attached palmtop computer, wherein the light source is positioned such that it does not obscure the screen;

a rechargeable battery pack disposed within the housing, the battery pack for providing power to the deployable light source and the attached palmtop computer;

coupling means connected between the docking station and the palmtop computer for effecting electrical communication therebetween; and at least one grip formed in the back face of the housing, the at least one grip including a recess in the back face of the housing into which the fingers of a human hand may be inserted, the recess spaced away from the sides of the housing a sufficient distance to form a griping surface having the shape of a cupped human hand when viewed in cross-section.

2. The docking station of claim 1, wherein coupling means comprises:

a power cable, the cable coupled between the rechargeable battery pack and the attached palmtop computer; and an RS-232 communication cable.

3. The docking station of claim 2, further comprising:

a function board provided within the housing, the function board including electronic communication circuitry operatively responsive to signals communicated between the docking station and an attached palmtop computer over the RS-232 communication cable; and an RJ-11 phone jack provided on the top of the housing, the phone jack in electrical communication with the function board.

4. The docking station of claim 3, wherein the RS-232 communication cable comprises a dual-in-line 8-pin serial connector, the serial connector configured to mate with a serial port provided on an attached palmtop computer.

5. The docking station of claim 4, wherein the function board includes a facsimile/modem circuit.

6. The docking station of claim 4, the function board further comprising:

a microprocessor;

a memory coupled to the microprocessor;

pager subsystem circuitry connected to the microprocessor for receiving alpha/numeric page signals, the pager circuitry including means for signaling the microprocessor that a page is incoming, the microprocessor receiving the page signals from the pager circuitry and storing the page signals in the memory such that alpha/numeric pages in excess of 55 characters are received by the pager subsystem circuitry during a single alpha page session; and means for alerting a user that a page has been received.

7. The docking station of claim 6, the pager subsystem circuitry configured to receive page signals in the about 150 to about 450megahertz frequency bands.

8. The docking station of claim 6, wherein the pager subsystem circuitry includes means for receiving page signals in the 900 megahertz frequency band.

9. A hand-holdable docking station adapted for mechanical and electrical connection with a palmtop computer, the docking station comprising:

a housing having a top, a bottom, a left side, a right side, and front and back faces, the housing for enclosing and defining an interior volume;

means for securely affixing a palmtop computer to the docking station;

means for illuminating the screen of an attached palmtop computer, the illumination means disposed such that the entire screen is unobstructed when viewed from a position normal to the screen, the illumination means further having an illumination footprint substantially equal to the plane dimensions of the computer screen;

a rechargeable battery pack disposed within the housing, the battery pack providing power to the illumination means and the attached palmtop computer;

coupling means connected between the docking station and the palmtop computer for effecting electrical communication therebetween; and grasping means formed in the back face of the housing, the grasping means including a recess disposed in the back face of the housing into which the fingers of a human hand may be inserted, the grasping means positioned such that when grasped, no part of a human hand obscures the screen of an attached palmtop computer.

10. The docking station of claim 9, the illumination means comprising a deployable light source, the light source disposed in a receptacle provided in the housing when the light source is in an undeployed position, the light source being deployable to a position such that the illumination footprint illuminates the screen of an attached palmtop computer.

11. The docking station of claim 10, the deployable light source further comprising:

a U-shaped support arm rotatably connected to the housing at a leg of the U; and a light fixture housing, disposed at the distal end of the support arm, the light fixture housing including a light bulb and a cylindrical hood disposed to cover the bulb, the hood having a slit formed along a major surface thereof, the slit directing light from the bulb in a substantially wedge-shaped beam, the support arm positioning the light fixture housing such that the beam has a footprint substantially equal to the screen of an attached palmtop computer.

12. The docking station of claim 11, wherein the cylindrical hood is rotatable.

13. A hand-holdable docking station adapted for mechanical and electrical connection with a palmtop computer, the docking station comprising:

a housing;

means for securely affixing a palmtop computer to the housing;

a deployable light source, housed/stored in a receptacle, provided in the housing, when the light source is in an undeployed position, the light source being deployable to a position such that the illumination footprint illuminates the screen of an attached palmtop computer, wherein the light source is positioned such that it does not obscure the screen;

a rechargeable battery pack disposed within the housing, the battery pack for providing power to the deployable light source and the attached palmtop computer;

coupling means connected between the docking station and the palmtop computer for effecting electrical communication therebetween; and means for grasping the housing, the grasping means providing for ergonomic positioning of a human hand to allow substantially fatigue free handling of the docking station, the grasping means further for positioning a grasping hand such that the hand does not obscure viewing of the attached palmtop computer screen.

14. The docking station of claim 13, the grasping means comprising at least one grip formed in the housing, the at least one grip including a recess formed in a back face of the housing into which the fingers of a human hand may be inserted, the recess spaced away from the sides of the housing a sufficient distance to form a griping surface having the shape of a cupped human hand when viewed in cross-section.

* * * * *